Oct. 25, 1966     H. ROTH     3,281,814
APPARATUS FOR DETECTING ABNORMAL RISE IN MOISTURE CONTENT
OF A PRESSURIZED GAS WITHIN A CONTAINER FOR SUPPLYING
PRESSURIZED GAS TO A GAS BLAST CIRCUIT BREAKER
Filed May 1, 1964
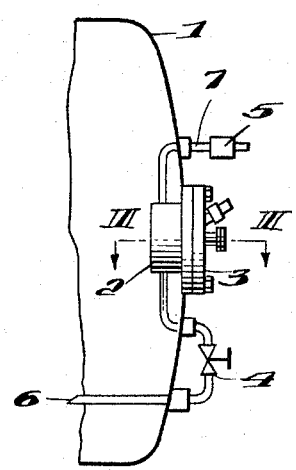
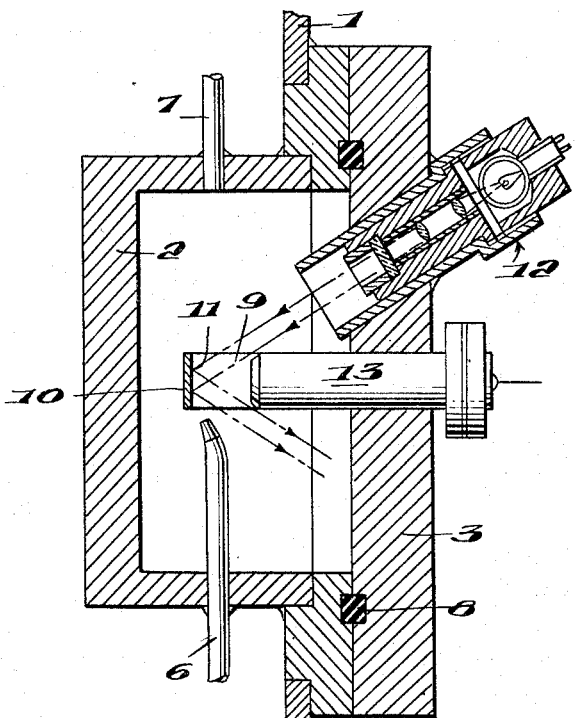
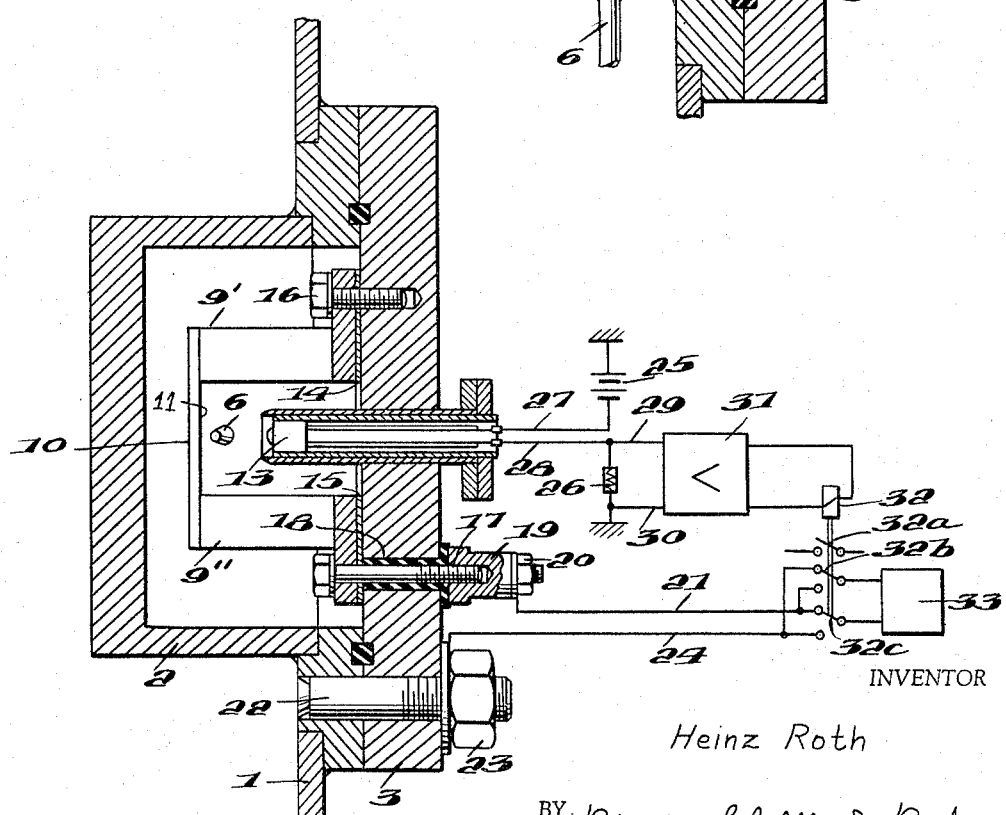
INVENTOR
Heinz Roth
BY Pierce, Scheffler & Parker
ATTORNEYS //  
United States Patent Office 3,281,814  
Patented Oct. 25, 1966

3,281,814  
APPARATUS FOR DETECTING ABNORMAL RISE IN MOISTURE CONTENT OF A PRESSURIZED GAS WITHIN A CONTAINER FOR SUPPLYING PRESSURIZED GAS TO A GAS BLAST CIRCUIT BREAKER  
Heinz Roth, Neuenhof, Aargau, Switzerland, assignor to Aktiengesellschaft Brown, Boveri & Cie, Baden, Switzerland, a joint-stock company  
Filed May 1, 1964, Ser. No. 364,199  
Claims priority, application Switzerland, June 28, 1963, 8,059/63  
6 Claims. (Cl. 340—235)

This invention relates to a humidity indicator for the supervision of the moisture content in gases, using a Peltier element whose cold solder joint is thermically connected to a dew point indicator surrounded by the gas to be supervised.

The invention is applicable to gas filled apparatus in general and is of particular advantage when used as an adjunct for circuit breakers of the gas-blast type. It is also applicable, for example, to multi-stage pressure gas compressors for controlling inter-stage cooling equipment.

To determine the moisture content of a gas, dew point measuring instruments using a Peltier element have become know. In them, the dew point indicator is a reflector surface which is thermically coupled to a joint, for instance a solder joint, of two suitable conductors. By controlling the Peltier current the reflector surface is cooled until is assumes the dew point temperature and dew precipitates on it. The dew formation is determined by a radiation-sensitive arrangement in that the light of a light source is reflected by the reflector to a photocell device, whereby a considerable portion of the light no longer reaches the photo cell due to changed diffusion conditions when the reflector becomes covered with moisture. If the requirements for accuracy are not too stringent, the reflector temperature need not be measured, since at a given environmental temperature there is an established relation between the strength of the Peltier current and the temperature of the cold solder joint so that the current can be utilized directly to determine the dew point temperature. After precipitation, the reflector is again cleared for a short period by reversing the polarization of the Peltier current. In this manner, the dew point can be continually controlled by periodic precipitation and clearing of the reflector. However, for the control of the moisture content in the gas, for instance in a gas-blast circuit breaker, such dew point measuring measurements have certain disadvantages. If the gas is relatively dry, considerable Peltier currents are required due to the fact, the dew point temperature being low thereby, the necessary temperature difference must be attained between cold and hot solder joints, which makes the power source expensive. Furthermore, the pressure gas, besides water vapor, frequently contains oil vapor or even oil droplets as well as dust and dirt particles. It cannot be prevented that such particles precipitate on the mirror, thus making the clear indication of condensed water difficult or even more impossible after a short while. The danger of precipitation of such disturbing impurities is the greater, the greater the temperature drop between pressure gas and reflector (thermal precipitation). This situation can happen very often, for instance when the gas is relatively dry, or when the container wall is well heated by, say sun rays. Experience has taught that the reflectors of such temperature measuring instruments must be cleaned frequently in order to make sure that they indicate accurately. The frequency of the cleaning cycle thereby depends, aside from the purity of the gas, above all also on the number of precipitations and clearings. Each single precipitation of condensed water favors an accumulation of dirt particles or oil droplets on the reflector surface, thus rendering a clear identification of the dew point more difficult.

In apparatus filled with presure gas, especially in gasblast circuit breakers, it is, however, not necessary to know the dew point at all times. The problem posed here is rather that of checking by means of a moisture indicator as to whether the coldest spot of the apparatus has approached the dew point of the pressure gas within predetermined limits. It is therefore suggested according to the invention to provide a thermal connection between the hot solder joint of the Peltier element and a wall part of the pressure gas container and to maintain a predetermined, approximately constant temperature difference between the hot and cold solder joints by charging the Peltier element with an appropriate current. This way, the dew point temperature of the reflector is attained only in rare cases, because the dew point of the pressure gas in gas-blast apparatus is generally quite low, if only a few degrees are provided as the temperature difference, so that in advantageous manner rapid soiling of the reflector can be avoided, thus enabling the dew point indicator to operate with as little maintenance as possible.

The drawing represents one design example which explains in more detail the concept of the invention.

FIG. 1 shows the installation of a moisture indicator in a pressure gas vessel.

FIG. 2 shows a vertical section, at an enlarged scale, of the moisture indicator according to FIG. 1.

FIG. 3 shows a horizontal section at an enlarged scale taken on line III–III of the moisture indicator according to FIG. 1.

In FIG. 1, a pressure gas container is designated as 1 whose face wall has a potlike chamber 2. The gas within container 1 is intended for use in conjunction with operation of an electrical circuit breaker of the gas blast type. 3 is a detachable cover flange which serves as the base plate for mounting the components of the moisture indicator.

One side of chamber 2 connects with the pressure gas container 1 via feed pipe 6, the other with the open air via discharge pipe 7. Located in feed pipe 6 is a shut-off valve 4 which is always open during operation and closed only if the moisture indicator is to be dismounted so as to maintain operational readiness of the pressure gas container. A throttling valve in the discharge pipe 7 is designated at 5 which is expediently ajustable in a manner known as such. The reference numerals in FIG. 2 correspond to those of FIG. 1. As can be seen at a glance, chamber 2 extends into pressure gas container 1. Cover flange 3 seals it gastight by means of gasket 8. The cover flange 3 carries a Peltier element 9 whose legs 9′, 9″ are connected by a cross member 10 made of a thermally and electrically well conductive material. Cross member 10 has reflecting surface at point 11 consisting, for instance, of a polished, galvanic nickle or chrome coating. The cover flange 3 further carries the illuminating device 12 and the photo diode unit 13. The latter is arranged so that, if surface 11 is clean and reflecting, the condition indicated in FIG. 2, it is not hit by the light rays of the illuminating device 12. FIG. 3 shows more clearly how the Peltier element 9 is mounted on the cover flange 3. While one leg 9′ together with a lead washer 14 is screwed to cover flange 4 by means of screw 16, the other leg 9″ rests upon anodized aluminum washer 15, thus achieving good electrical insulation and good thermal contact. Screw 17 is encased in an insulating sleeve 18 and screwed into the tapped part 19. The electrical line 21 is connected to the latter by means of nut 20. Otherwise, cover flange 3 is mounted by means of bolts 22, of which several are spaced along its periphery, and nuts 23 and connected to the electrical line 24. 25 is a source of direct current and 26 a working resistance connected to the photo diode 13 via lines 27 and 28. The working resistance connects to the input of amplifier 31 via lines 29, 30. In the output circuit of amplifier 31 is relay 32 with the switchings contacts 32a, 32b, 32c. Thereby the switching contacts 32b, 32c form a bipolar reverser, via which a source 33 of direct current is connected with lines 21, 24.

The arrangement operates as follows:

The gas to be controlled flows from pressure gas container 1 via feed pipe line 6 into chamber 2, whereby the shut-off valve 4 (FIG. 1) is normally always open. On the other side, some gas is constantly drained from chamber 2 via discharge pipe line 7 and throttle valve 5. In this manner, a slight flow-through is maintained in chamber 2, accelerating precipitation on the reflecting surface 11 and obtaining the dew point more quickly than what would be possible with the gas at rest. The Peltier current furnished by the direct current source 33 is expediently adjusted so as to create at the cold solder joint (cross member 10, reflecting surface 11) of the Peltier element 9 a temperature about 2 to 5 degrees lower than at the cover flange 3 which is at environmental i.e. the temperature of the container wall temperature and which corresponds to the hot solder joint of the Peltier element. In order to obtain a nearly constant temperature difference over a larger environmental temperature range, say from minus 50 to 50° C., as would for instance be needed for a pressure gas container erected in the open, the Peltier current can be adjusted with sufficient accuracy in simple manner with the aid of a resistor dependent on temperature and added to the Peltier circuit in a fashion known as such. As long as the dew point has not been reached, which will be the case so long as the moisure content of the gas within container 1 does not exceed an acceptable normal, the beam of parallel rays emitted by light device 12 is reflected by the clean reflecting surface 11 past the photo diode 13 (FIG. 2). However, if the reflecting surface 11 becomes clouded by dew or hoarfrost when a dew point is reached as a result of an increase in the moisture content of the gas to a dangerously high level, a part of the light will now fall into the photo diode 13 due to diffusion. This causes the starting photo current to create a voltage drop at the working resistance 26 which is amplified sufficiently by amplifier 31 to make relay 32 respond. This causes contacts 32a to close and excite an alarm device of known kind, whereby at the same time remedial measures can automatically be introduced for drying the gas in the pressure gas container. They can, for example, consist in starting an intensive replacement of the gas in the pressure gas container with dry gas by opening throttle valve 5 (FIG. 1) wider. For this purpose, the valve can be provided with a suitable actuating magnet which frees a larger cross section of its opening when relay contacts 32a are closed. Contacts 32b, 32c are also actuated when relay 32 responds and effect a reversal of polarity of the Peltier current furnished by the direct current source 33 which, in known manner, results in heating and clearing the reflecting surface 11, because now the cold and the hot solder joints reverse their functions. After clearing is completed, relay 32 returns to the position shown, because photo diode 13 is no longer struck by light and the voltage drop across the working resistance 26 hence disappears. The illustrated mutual arrangement of the illuminating device, reflecting surface and photo diode has the advantage of forming an "either-or" arrangement, in which the brightness fluctuations of the light source remain without influence on the response.

The improved arrangement is not limited to the specific application which has been described. It can, for instance also be used advantageously on a wall part of a multiple-stage pressure gas compressor unit with between stage cooling in order to avoid undesirable condensed water separation between stages. In this case, upon response of relay 32 the cooling between stages is automatically lessened as soon as a predetermined safety tolerance from the dew point temperature has been approached.

I claim:

1. Apparatus for detecting an abnormal rise in moisture content of a pressurized gas within a container used for the supply of gas to a circuit breaker of the gas blast type, said apparatus comprising means carried by said container and establishing a moisture detecting chamber, means for passing a constant stream of gas from the interior of said container through said chamber, a Peltier element located within said chamber, a mirror secured to the cold end of said Peltier element, means establishing a heat transfer relation between the hot end of said Peltier element and the wall of said container, a light source producing a light beam within said chamber and which is reflected by said mirror, means producing a current flow through said Peltier element, the temperature of said mirror established by the selected level of current flow being below that of the wall of said container by an amount which under a normal level of moisture entrainment in said gas will prevent condensing out of the moisture upon said mirror but which will result in formation of a condensate on said mirror in the event of an abnormal rise in the moisture content of the gas, a photocell receiving light reflected by said mirror only when moisture entrained in said gas is condensed upon the surface of said mirror, and means responsive to the output of said photocell induced by reception of the reflected light for initiating an alarm.

2. Apparatus as defined in claim 1 for detecting an abnormal rise in moisture content of a pressurized gas within a container, wherein said means responsive to the output of said photocell comprises an amplifier and relay means actuated by the output of said amplifier, said relay means including means for closing a circuit to said alarm and means for reversing the direction of current flow through said Peltier element.

3. Apparatus as defined in claim 1 for detecting an abnormal rise in moisture content of a pressurized gas within a container, wherein the level of current flow through said Peltier element is such as to maintain a temperature difference of from two to five degrees between the cold and hot ends of said Peltier element.

4. Apparatus as defined in claim 1 for detecting an abnormal rise in moisture content of a pressurized gas within a container, wherein said chamber for said Peltier element is provided by a casing mounted in a wall opening in said container, and said Peltier element, light source and photocell are mounted on a plate secured in place over said wall opening and which serves as a cover for said casing.

5. Apparatus as defined in claim 1 for detecting an abnormal rise in moisture content of a pressurized gas within a container, wherein said means for passing a constant stream of gas from the interior of said container through said moisture detecting chamber includes a gas lead-in line from the interior of said container and a gas lead-out line from said moisture detecting chamber to the exterior of said container.

6. Apparatus as defined in claim 5 wherein said gas lead-in line includes a cut-off valve and wherein said gas lead-out line includes a throttling valve.

References Cited by the Examiner

UNITED STATES PATENTS 2,979,950 4/1961 Leone _____ 73—17 X
3,112,648 12/1963 Dulk et al. _____ 73—17 X LOUIS R. PRINCE, *Primary Examiner.*

M. B. HEPPS, *Assistant Examiner.*